United States Patent [19]
Ho

[11] Patent Number: 5,613,667
[45] Date of Patent: Mar. 25, 1997

[54] SHOCK ABSORBER FOR ELEVATORS OR THE LIKE

[76] Inventor: Jui-Chien Ho, 10Fl., No. 68, Chung-Hua 1st, Kaohsiung, Taiwan

[21] Appl. No.: 670,653

[22] Filed: Jun. 26, 1996

[51] Int. Cl.⁶ .............................. F16F 3/08; B60G 25/00
[52] U.S. Cl. .................. 267/141.1; 267/294; 267/140.4; 248/621; 248/638
[58] Field of Search .................... 267/120, 136, 267/139, 140, 140.4, 141, 141.1, 152, 294; 248/562, 576, 581, 619, 621, 632, 634, 636–638; 187/292

[56] References Cited

U.S. PATENT DOCUMENTS

| 1,998,206 | 4/1935 | Rosenzweig | 248/621 |
|---|---|---|---|
| 2,189,708 | 2/1940 | Coyne | 267/140.4 |
| 4,930,758 | 6/1990 | Poirier | 267/141.1 |
| 4,976,412 | 12/1990 | Simon et al. | 267/141.1 |
| 5,027,925 | 7/1991 | Kahkipuro | 187/292 |
| 5,402,861 | 4/1995 | Kohara | 187/292 |

FOREIGN PATENT DOCUMENTS 0312448  4/1989  France ............................ 267/141.1

Primary Examiner—Robert J. Oberleitner
Assistant Examiner—Chris Schwartz
Attorney, Agent, or Firm—Varndell Legal Group

[57] ABSTRACT

A shock absorber connected between a foot plate and the bottom side of the cab of an elevator for absorbing shock waves, including two first springy members fixed to the foot plate by a respective mounting plate, a bridging plate horizontally mounted on said first springy members and having a recessed portion in the middle, and a second springy member having a first mounting plate at the bottom fixed to the recessed portion of the bridging plate and a second mounting plate at the top fixed to the bottom side of the cab.

5 Claims, 5 Drawing Sheets

SHOCK ABSORBER FOR ELEVATORS OR THE LIKE

BACKGROUND OF THE INVENTION

The present invention relates to shock absorbers, and relates more specifically to such a shock absorbing device adapted for use in an elevator to absorb shock waves.

When the cab of an elevator is moving, it tends to be forced to vibrate due to improper design or poor installation quality of the host cables and the shaft of the elevator. In order to lessen shock waves, a rubber foot plate may be used and attached to the bottom side of the cab. However, simply attaching a rubber foot plate to the cab cannot effectively eliminate the occurrent of noise and prohibit the transmission of shock waves to the body of the cab.

SUMMARY OF THE INVENTION

It is one object of the present invention to provide a shock absorber for elevators which prohibit shock waves from transmitting to the cab. It is another object of the present invention to provide a shock absorber for elevators which is easy to install. It is still another object of the present invention to provide a shock absorber for elevators which is inexpensive to manufacture. According to the present invention, the shock absorber is connected between a foot plate and the bottom side of the cab of an elevator for absorbing shock waves, comprising two first springy members fixed to the foot plate by a respective mounting plate, a bridging plate horizontally mounted on said first springy members and having a recessed portion in the middle, and a second springy member having a first mounting plate at the bottom fixed to the recessed portion of the bridging plate and a second mounting plate at the top fixed to the bottom side of the cab.

DETAILED DESCRIPTION OF THE PREFERRED EMBODIMENT

Figure 1:
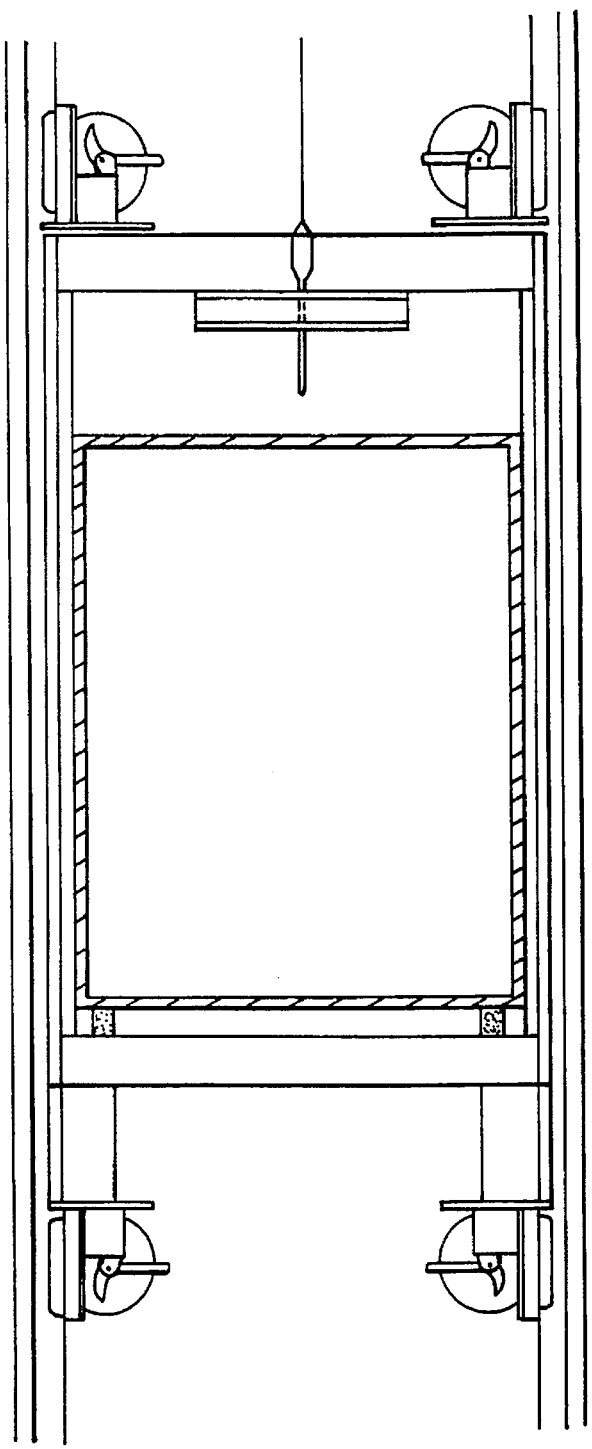
FIG. 1 is a plain view of a conventional elevator.
Figure 3:
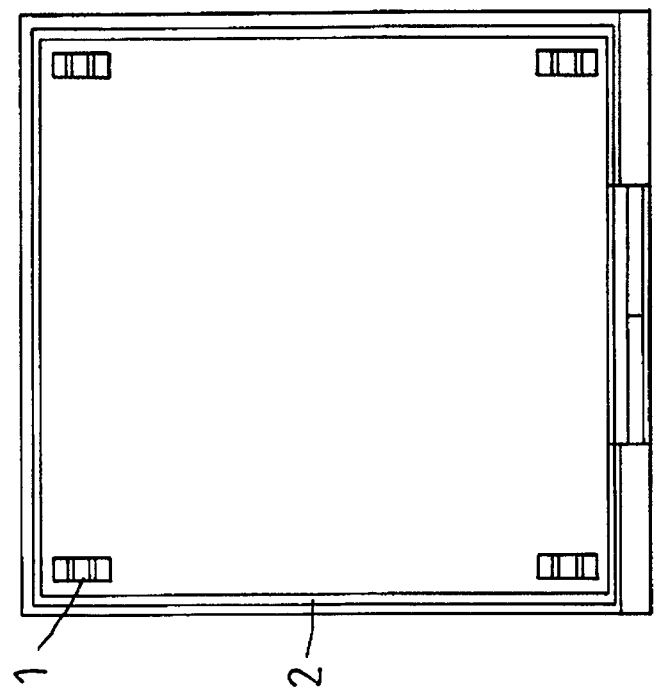
FIG. 3 is a top plain view showing shock absorbers installed in the cab of an elevator according to the present invention.
Figure 2:
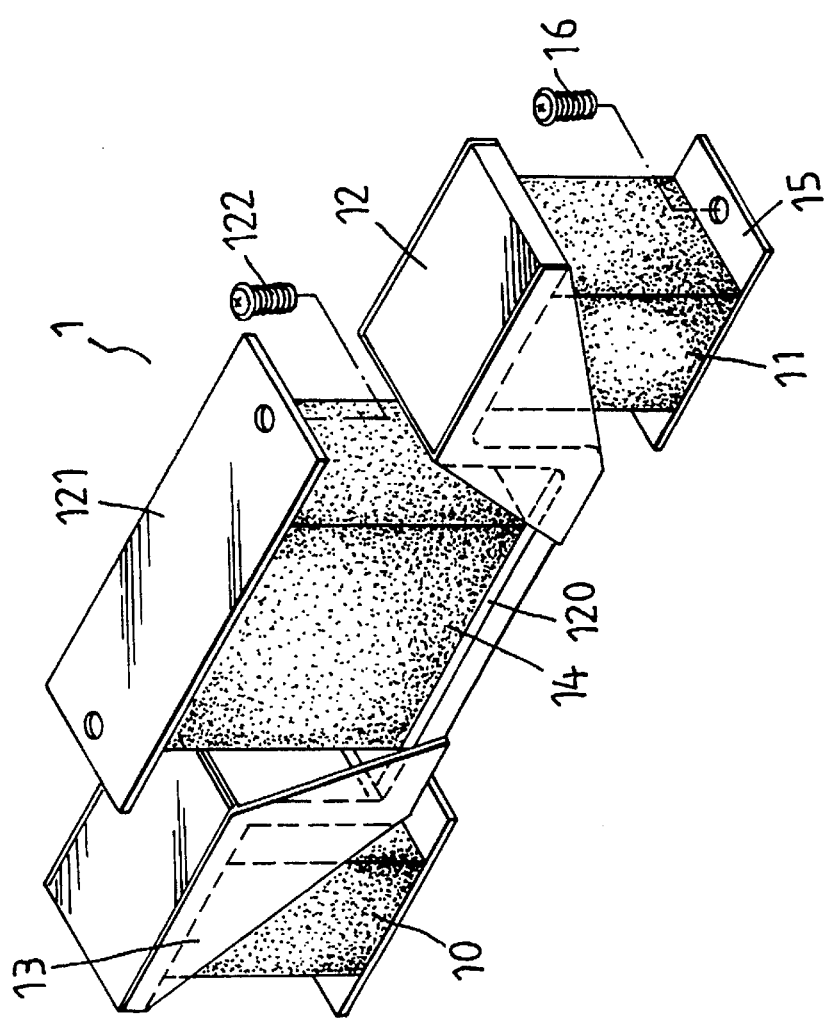
FIG. 2 is a perspective elevation of a shock absorber according to the present invention.
Figure 4:
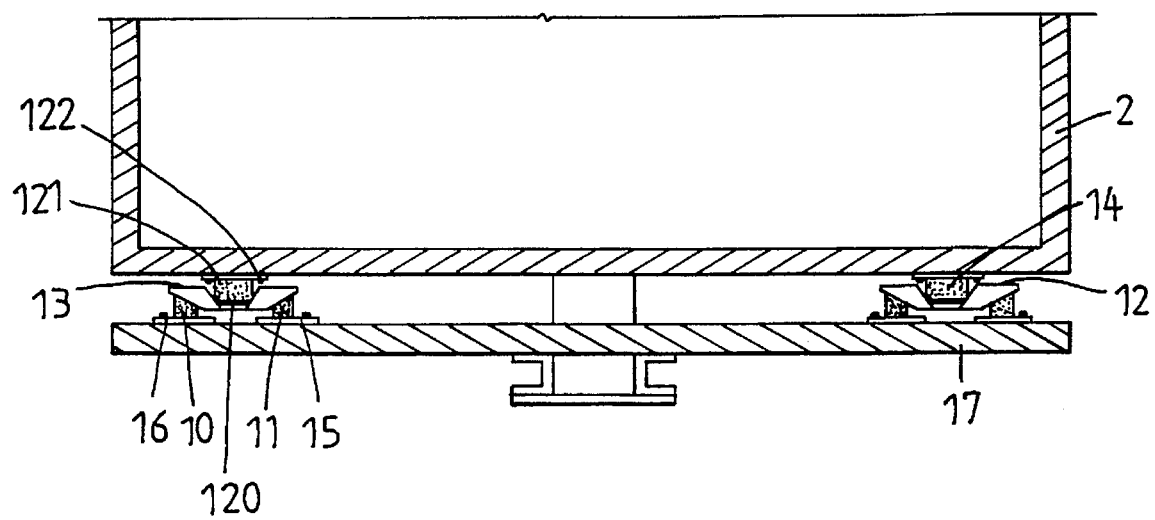
FIG. 4 is a side view in section of the bottom side of the cab shown in FIG. 3, showing the shock absorbers installed in the bottom side of the cab.
Figure 5:
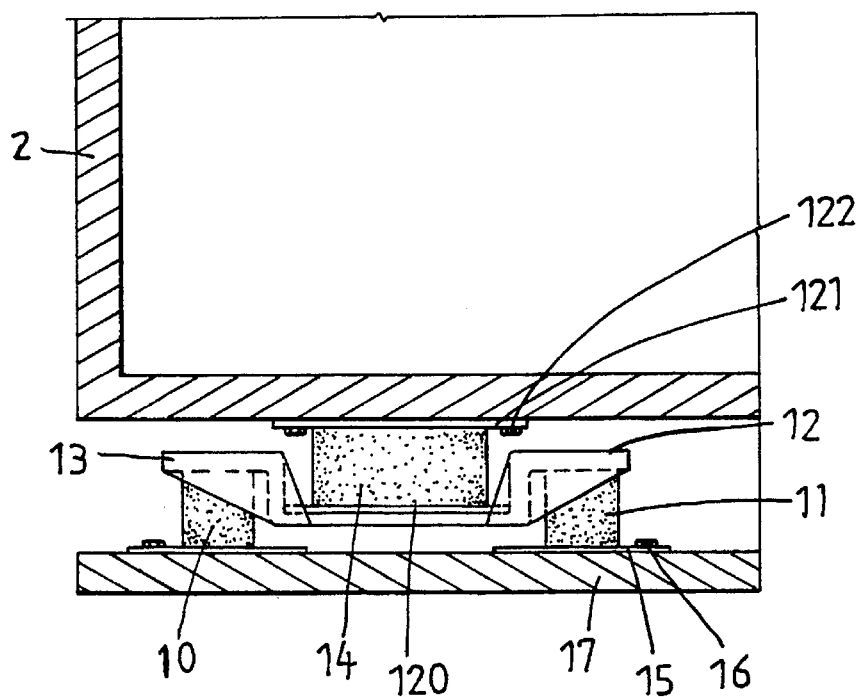
FIG. 5 is an enlarged view of the left part of FIG. 4.

Referring to FIG. 2, a shock absorber 1 in accordance with the present invention comprises two first springy members 10,11 of equal size, a bridging plate 12 horizontally mounted on the springy members 10,11 at the top which has reinforcing ribs 13 at the front and back sides thereof, and a second springy member 14 fixedly mounted on the recessed middle part of the bridging plate 12 by a mounting plate 120. The springy members 10,11,14 can be rubber members or metal springs. A mounting plate 121 is fixedly mounted on the top of the second-springy member 14 and spaced above the top side of the bridging plate 12, and adapted for securing to the bottom side of the cab 2 of an elevator by screws 122 (see also FIG. 3). Further, the first springy members 10,11 are fixedly mounted with a respective mounting plate 15 at the bottom. FIG. 3 shows four shock absorbers 1 installed in the four corners of the bottom side of the cab 2 of an elevator.

Figure 6:
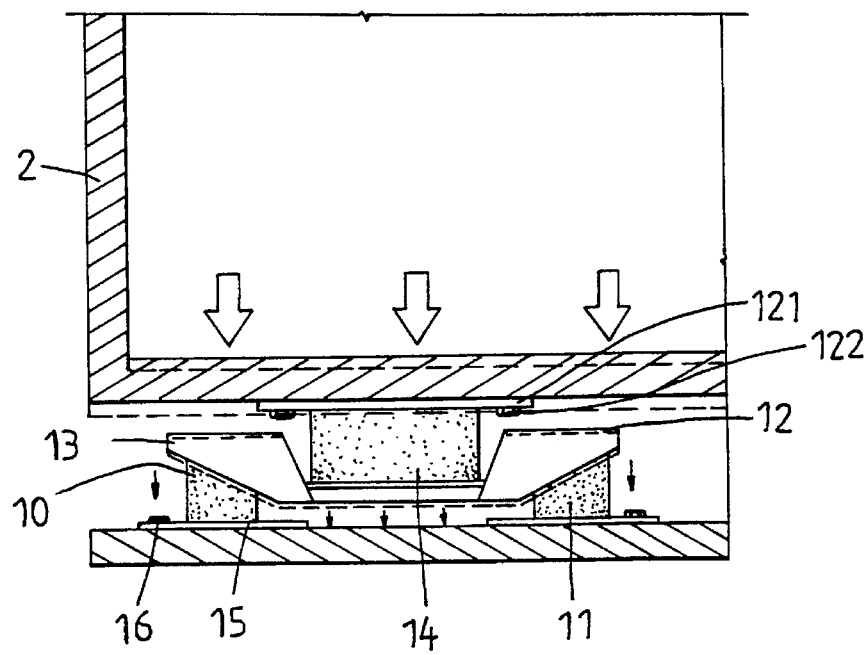
FIG. 6 is similar to FIG. 5 but showing shock waves transmitted to the springy members.
Figure 7:
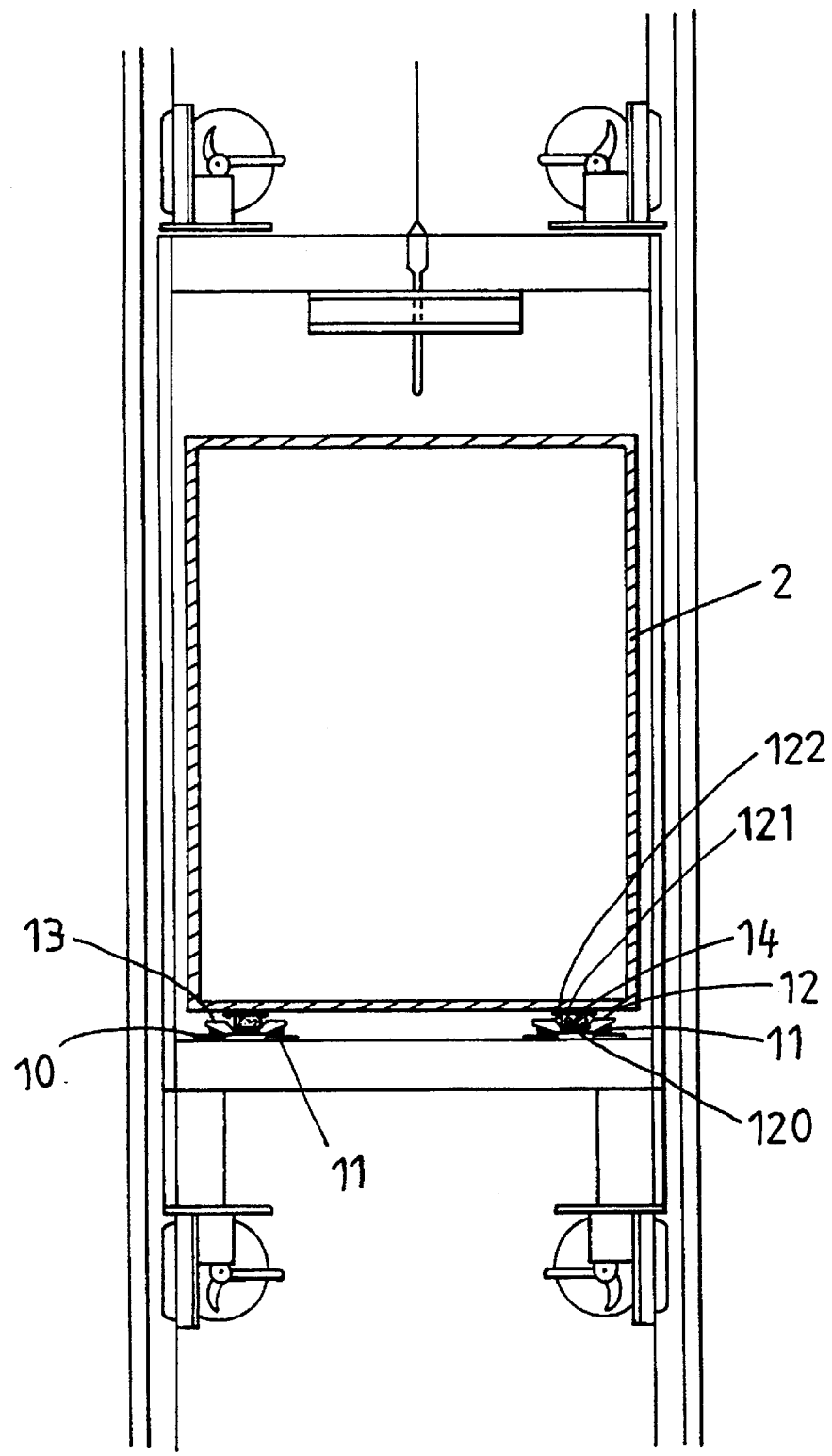
FIG. 7 is a plain view of an elevator according to the present invention.

Referring to Figures from 4 to 7 and FIG. 2 again, the mounting plate 121 of the second springy member 14 is fixedly secured to the bottom side of the cab 2 by screws 122, the mounting plates 15 of the first springy members 10,11 are respectively and fixedly secured to a foot plate 17 by screws 16. As seen in FIG. 2 a clearance is maintained between the bridging plate and the first springy members as indicated by the vertical dashed lines. When the cab 2 is lowered and the foot plate 17 is stopped against an object, shock waves are transmitted to the first springy members 10,11 and then the second springy member 14 through the bridging plate 12. Therefore, shock waves are quickly absorbed or lessened. Cushion means may be used and installed so as to keep the foot plate 17 in horizontal if the cab 2 tilts from the vertical line (see FIGS. 6 and 7).

Figure 8:
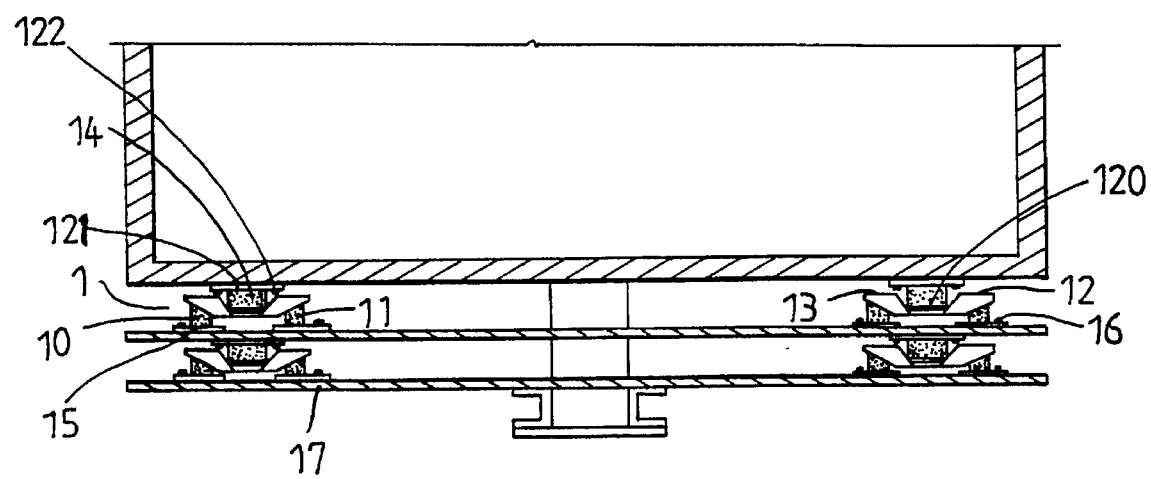
FIG. 8 is an applied view of the present invention, showing two foot plates coupled to the cab at the bottom at different elevations.

Referring to FIG. 8, sets of shock absorbers 1 may be installed to secure a plurality of foot plates 17 to the bottom side of the cab at different elevations.

While only one embodiment of the present invention has been shown and described, it will be understood that various modifications and changes could be made without departing from the spirit and scope of the invention disclosed.

I claim:

1. A shock absorber connected between a foot plate and the bottom side of the cab of an elevator for absorbing shock waves, comprising two first springy members fixed to said foot plate by respective mounting plates, a bridging plate horizontally mounted on top of said first springy members and having a recessed portion in the middle, and a second springy member having a first mounting plate at a bottom side thereof fixed to the recessed portion of said bridging plate and a second mounting plate at a top side thereof fixed to the bottom side of said cab.

2. The shock absorber of claim 1 wherein the top side of said second springy member is disposed at a higher elevation than the topmost edge of said bridging plate.

3. The shock absorber of claim 1 wherein a clearance is maintained between said bridging plate and said first springy members.

4. The shock absorber of claim 1 wherein said bridging plate has a plurality of reinforcing ribs disposed at front and back sides thereof.

5. The shock absorber of claim 1 wherein the second mounting plate of said second springy member is fixed to the bottom side of said cab by screws.

* * * * *